United States Patent

Berger et al.

[15] 3,700,744
[45] Oct. 24, 1972

[54] SIMULTANEOUS RECOVERY AND PRODUCTION OF PURE XYLENES FROM A C AROMATIC MIXTURE

[72] Inventors: Charles V. Berger; Donald B. Broughton, both of 30 Algonquin Road, Des Plaines, Ill. 62516

[73] Assignee: Universal Oil Products Company, Des Plaines, Ill.

[22] Filed: Sept. 18, 1970

[21] Appl. No.: 73,467

[52] U.S. Cl. .......260/668 A, 260/674 A, 260/674 SA
[51] Int. Cl. ..............................................C07c 15/08
[58] Field of Search .........260/668 A, 674 A, 674 SA

[56] References Cited

UNITED STATES PATENTS

| | | | |
|---|---|---|---|
| 2,741,646 | 4/1956 | Clark | 260/668 A |
| 3,584,068 | 6/1971 | Jackson et al. | 260/674 A |
| 3,558,732 | 1/1971 | Neuzil | 260/674 SA |
| 3,126,425 | 3/1964 | Eberly et al. | 260/674 SA |
| 3,522,153 | 7/1970 | King | 260/674 SA |
| 3,558,730 | 1/1971 | Neuzil | 260/674 SA |

*Primary Examiner*—Curtis R. Davis
*Attorney*—James R. Hoatson, Jr. and Robert W. Erickson

[57] ABSTRACT

Each xylene isomer, in relatively pure form, is recovered and produced from a $C_8$ mixture containing the same and ethylbenzene by a combination of fractionation and selective zeolitic molecular sieve separation involving fractionation of a $C_8$ aromatic stream to produce an ortho-xylene free, ethylbenzene, meta-xylene and para-xylene fraction for subsequent isomerization, a relatively pure ortho-xylene fraction and a mixed, ortho-xylene and ethylbenzene free, meta-xylene and para-xylene fraction which is further separated by selective zeolitic adsorption.

12 Claims, 1 Drawing Figure

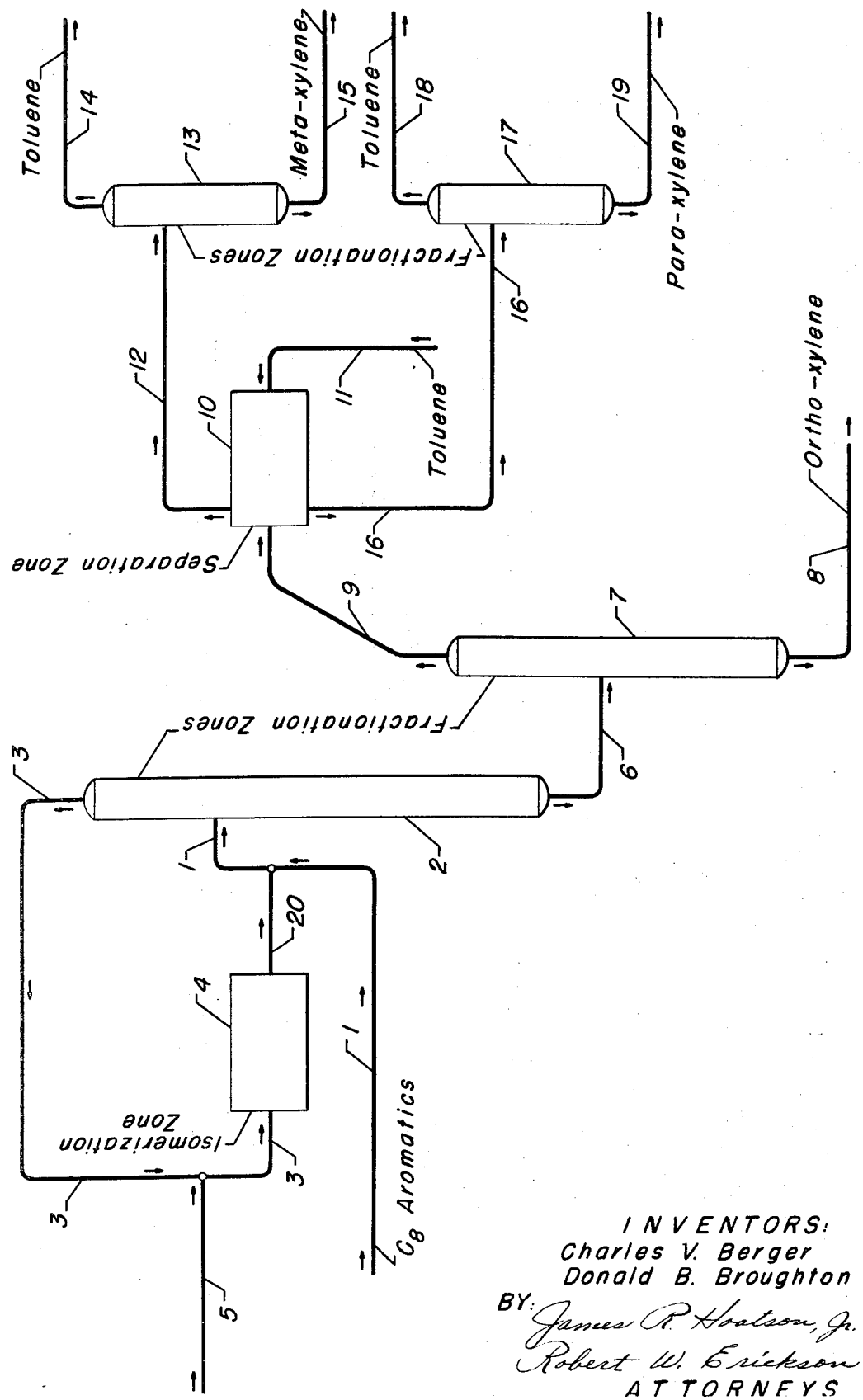

SIMULTANEOUS RECOVERY AND PRODUCTION OF PURE XYLENES FROM A C AROMATIC MIXTURE

BACKGROUND OF THE INVENTION

The present invention pertains to a process for the simultaneous recovery and production of each of the xylene isomers, in a relatively pure state, from a $C_8$ aromatic mixture containing the same in admixture with ethylbenzene. More particularly, the present invention pertains to a combination process utilizing the combined steps of fractionation, isomerization and selective molecular sieve adsorption to separate and produce each of the individual xylene isomers in a relatively pure state from a mixture of the same and ethylbenzene.

Each of the xylene isomers are important items of commerce because of their being intermediates in various petrochemical products. For example, para-xylene is used in the production of terephthalic acid, ortho-xylene is used in the production of phthalic anhydride and meta-xylene is used in the production of isophthalic acid. These xylene isomers are derived from either coal or petroleum sources, by means well known to those trained in the art. In a typical $C_8$ aromatic stream derived from a petroleum sources, the predominant source of xylenes, all of the $C_8$ aromatic isomers are present in varying quantities such as about 5 – 20 percent ethylbenzene, 10–24 percent para-xylene, 40–60 percent meta-xylene and 5–20 percent ortho-xylene. Not only are these isomers not readily separated by the present art without resort to intricate, sophisticated techniques, the demand for each individual isomer is not typically equal to its supply and availability. For example, para-xylene and ortho-xylene are much more in demand than meta-xylene but the meta-xylene availability is at least twice that of either para-xylene or ortho-xylene. Hence, the art produces the additional quantities of para-xylene and/or ortho-xylene required by isomerization of meta-xylene and/or ethylbenzene.

As stated, the $C_8$ aromatics are not readily separated into relatively pure species. The ortho- isomer is readily recovered by conventional fractional distillation techniques but since the meta- and para- isomer differ by only 0.7° C. in boiling point, more intricate methods are utilized by the art to separate these two isomers. For example, relatively pure para-xylene may be produced by fractional crystallization and relatively pure meta-xylene may be produced by selective sulfonation or $HF-BF_3$ extraction but neither of these methods will readily produce both isomers in a relatively pure state. Thus, for example, in fractional crystallization, a pure para-product is produced but the resultant mother liquor also contains appreciable amounts of para-xylene, hence a pure meta- product is not produced. Also difficult to remove from a $C_8$ aromatic mixture is ethylbenzene since such a separation is effected only by utilizing a superfractionator(s) of about 300–400 plates employing a reflux ratio of about 50–250.

SUMMARY OF THE INVENTION

Accordingly, it is an object of the present invention to provide a novel process for recovering and producing each of the individual xylene isomers from a $C_8$ aromatic mixture containing the same and ethylbenzene. This object is accomplished by a combination of fractionation, isomerization and selective molecular sieve separation which yields each isomer in a relatively pure state and enables one to alter somewhat, the relative amounts of each isomer to be produced.

In an embodiment therefore, the present invention relates to a process for the simultaneous recovery and production of meta-xylene, para-xylene and ortho-xylene from a $C_8$ aromatic stream which comprises first separating, by fractional distillation, a $C_8$ aromatic stream comprising ortho-xylene, meta-xylene and para-xylene and ethylbenzene to produce a relatively ortho-xylene-free, ethylbenzene, meta-xylene and para-xylene fraction, a relatively ortho-xylene and ethylbenzene free, mixed meta-xylene and para-xylene fraction and a relatively pure ortho-xylene fraction. Preferably, this fractional distillation is performed by first fractionating the $C_8$ aromatic stream to produce a relatively ethylbenzene free, ortho-xylene, meta-xylene and para-xylene fraction as bottoms and the mentioned relatively ortho-xylene free, ethylbenzene, meta-xylene and para-xylene fraction as an overhead and the relatively pure ortho-xylene fraction as bottoms. The thus produced ortho-xylene free, ethylbenzene, meta-xylene and para-xylene fraction is then isomerized by contacting said fraction, in an isomerization zone, with an isomerization catalyst maintained at an isomerization conditions so as to produce a $C_8$ aromatic mixture of ortho-xylene, meta-xylene, para-xylene and ethylbenzene. This $C_8$ aromatic isomerization mixture is then separated in the same manner as the $C_8$ aromatic stream previously described. The mixed meta-xylene and para-xylene fraction produced in the fractionation step is then separated, by selective, zeolitic crystalline aluminosilicate adsorption to produce a relatively pure para-xylene stream and a relatively pure meta-xylene stream. Preferably, this selective adsorption is effected by contacting the mixed meta-xylene and para-xylene fraction with a mass of crystalline aluminosilicate adsorbent contained in an adsorption zone maintained at adsorption conditions to effect the selective retention of an extract material containing either meta-xylene or para-xylene. A raffinate is then withdrawn from the adsorption zone and contains the less selectively retained xylene isomer. The adsorbent mass is then contacted at desorption conditions with a desorbent material to effect a removal of the extract material from the adsorbent and the extract stream is then withdrawn from the adsorbent mass in an admixture with the desorbent. Preferably, the selectively adsorbed xylene isomer is para-xylene and the meta-xylene is removed in the raffinate stream.

In an alternative embodiment, the present invention relates to a process for the simultaneous recovery and production of meta-xylene, para-xylene and ortho-xylene from a $C_8$ aromatic stream which comprises separating, by fractional distillation, a given $C_8$ aromatic stream comprising ortho-xylene, meta-xylene, para-xylene and ethylbenzene to produce a relatively ortho-xylene free, ethylbenzene, meta-xylene and para-xylene overhead fraction and a relatively ethylbenzene free, meta-xylene, para-xylene and ortho-xylene bottoms fraction. The overhead fraction thus produced is then contacted in an isomerization zone with an isomerization catalyst maintained at isomerization conditions to produce a $C_8$ aromatic mixture of ortho-xylene, meta-xylene, para-xylene and ethylbenzene which mixture is then separated in the same manner as the foregoing $C_8$ aromatic stream. The bottoms fraction produced in the fractional distillation is contacted with a zeolitic crystalline aluminosilicate mass selective for either para-xylene or meta-xylene at adsorption conditions to effect the retention of an extract material containing either meta-xylene or para-xylene and to produce a raffinate stream retaining the less selectively retained meta-xylene or para-xylene isomer in admixture with ortho-xylene. Preferably, para-xylene is the more selectively retained isomer and meta-xylene is withdrawn in the raffinate stream in admixture with the ortho-xylene. The extract material is withdrawn from the adsorption zone at desorption conditions, relatively free from the other $C_8$ aromatic isomers. The raffinate is separated by fractional distillation to produce a relatively pure ortho-xylene stream and a relatively pure stream comprising the less selectively retained meta-xylene or para-xylene which, in the preferred case, is meta-xylene.

Other objects and embodiments including a more detailed description of the foregoing embodiments and the crystalline aluminosilicates utilized therein will be found in the following more detailed description of the process of the present invention.

DESCRIPTION OF PREFERRED EMBODIMENTS $C_8$ aromatic feed stocks containing ortho-xylene, meta-xylene, para-xylene and ethylbenzene to be utilized in the process of the present invention are readily available from either petroleum or coal sources in a manner well known to those trained in the art. A particularly preferred source is the reformate produced a typical reforming process wherein a 200°–400°F. boiling range naphtha is reformed. The exact composition of the $C_8$ aromatic mixture so obtained is a function of the reforming conditions utilized and/or ultimate crude source but if the mixture recovered is deficient in a desired xylene isomer, it may be isomerized preferably after removal of the desired isomer to increase the amount thereof. Thus, $C_8$ aromatic streams as recovered from a reforming and/or alkylaromatic isomerization unit are within the scope of the present invention.

According to the process of the present invention, a $C_8$ aromatic stream of the type described is first separated, by fractional distillation, to produce a relatively ortho-xylene free (less than about 5 percent), ethylbenzene, meta-xylene and para-xylene fraction, a relatively pure ortho-xylene fraction (at least about 95 percent pure) and a relatively ortho-xylene and ethylbenzene free (no more than about 5 percent total), mixed meta-xylene and para-xylene fraction. This fractionation is readily effected by means well known to those trained in the art by employing either a single fraction column or a series of two or more fractionation columns. When utilizing a single fractionation column, the ethylbenzene, para-xylene and meta-xylene fraction is withdrawn overhead, the mixed para-xylene meta-xylene fraction is withdrawn as an intermediate side stream and the ortho-xylene is withdrawn as a bottoms fraction. A preferred mode of effecting this fractionation entails the utilization of a two step fractionation system. In this mode of operation, the $C_8$ aromatic stream is first fractionated to produce the ethylbenzene, meta-xylene and para-xylene fraction as an overhead fraction and to produce an ethylbenzene free, meta-xylene, para-xylene and ortho-xylene bottoms. These bottoms are then further fractionated to produce the mixed meta-xylene para-xylene fraction as an overhead and the ortho-xylene fraction as bottoms. When utilizing this two step fraction system the first step typically will involve a fraction column(s) of about 100–300 plates and employ a reflux ratio of about 2:1 to about 40:1 or more. The second step typically will require a column(s) of about 75–200 plates and employ a reflux ratio of about 2:1 to about 10:1.

The relatively ortho-xylene free, ethylbenzene, meta-xylene and para-xylene fraction thus produced is then isomerized by contacting this fraction in an isomerization zone, with an isomerization catalyst, maintained at isomerization conditions to produce a $C_8$ aromatic mixture of ortho-xylene meta-xylene, para-xylene and ethylbenzene. Preferably, in this mixture, the xylenes are present in approximately equilibrium amounts. This isomerization reaction is effected by means well known to those trained in the art by employing isomerization catalysts and conditions capable of isomerizing not only the xylenes but also capable of isomerizing ethylbenzene to xylenes. Since this ethylbenzene isomerization requires the ethylbenzene to go through a naphthene intermediate before the formation of a xylene, it is necessary to utilize an isomerization catalyst having a dual, acid-acting and hydrogenation-dehydrogenation function. This hydrogenation-dehydrogenation function is typically provided by a hydrogenation-dehydrogenation active metallic component such as a metal from group VIB, VIII and IB of the Periodic Table of Elements, preferably the platinum group metals, and particularly platinum. This metallic component is then combined in catalytically effective amounts, such as 0.1 to about 5 wt. percent, with an acidic refractory inorganic oxide support such as halogenated alumina, silica-alumina, the hydrogen forms of faujasite or mordenite and combinations of alumina and mordenite or faujasite. A particularly preferred catalytic composite comprises about 0.1 to about 2 wt. percent platinum and about 0.1 to about 5 wt. percent fluorine and/or chlorine combined with a gamma alumina carrier material.

The isomerization reaction itself is effected in an isomerization zone wherein the catalyst is utilized either as a fixed bed or moving bed with the reactants contacting the catalyst in an upflow, downflow or radial flow pattern. Preferred is a fixed bed, vapor phase, down flow system. Suitable isomerization condition under which the isomerization zone is maintained include a temperature of about 200° C. to about 650°C., particularly about 350°C. to about 550°C., pressures of about atmospheric to about 100 atmospheres and liquid hourly space velocities of about 0.1 to about 10 hr.$^{-1}$ Since a naphthene intermediate must be formed to isomerize the ethylbenzene, slightly hydrogenating conditions including the presence of hydrogen at a hydrogen to hydrocarbon mole ratio of 0.5:1 to about 20:1 are preferred. Preferably, the temperature pressure and space velocity are correlated to produce about 2 wt.% to about 8 wt.% $C_8$ naphthenes in the reaction product to insure efficient ethylbenzene isomerization. These naphthenes are recovered and recycled to the isomerization zone to prevent a net overall loss of aromatics to saturated products. Any $C_7-$ and/or $C_9+$ hydrocarbons produced by side reactions are readily removed by conventional fractionation techniques. Further, in some instances, halogen addition to the isomerization zone feed stock may be effected to control or maintain catalyst activity. Depending on activity desired, halogen concentrations can be from about 1 to about 1,000 ppm. weight can be utilized.

The resultant $C_8$ aromatic mixture, comprising a mixture of ortho-xylene, meta-xylene, para-xylene and ethylbenzene is then separated, in the same manner as the $C_8$ aromatic stream passed to the process of the present invention, by fractionation, in the hereinbefore described initial fractionation step. In the instance where the $C_8$ aromatic stream is in fact the effluent from an alkylaromatic isomerization zone, the described recovered overhead is simply isomerized in the same zone and passed in admixture with the thus produced $C_8$ aromatic stream to the initial fractional distillation. By utilizing this technique, additional amounts of ortho-xylene are produced and the ethylbenzene is readily separated for isomerization without employing intricate superfractionation techniques utilizing fractionators of 100–500 plates and reflux ratios of 25:1 to 200:1.

The mixed para-xylene meta-xylene fraction, relatively free of both ortho-xylene and ethylbenzene (i.e., preferably less than about 1 percent of each isomer) produced in the described fractionation step is separated by selective zeolitic crystalline aluminosilicate adsorption to produce a relatively pure para-xylene stream (i.e. less than 2 percent other $C_8$ aromatics) and a relatively pure meta-xylene stream (i.e. less than 2 percent other $C_8$ aromatics). This separation is accomplished by utilizing zeolitic crystalline aluminosilicates (molecular sieves) selective for one of these two isomers—i.e. either para-selective or meta-selective.

In adsorptive-separation processes, an important factor used to determine the ability of a particular adsorbent to separate para-xylene and meta-xylene is the selectivity of the adsorbent for one isomer compared to the other isomer. The selectivity (B) as used herein is defined as the ratio of the two isomers in an adsorbed phase over the ratio of the same two isomers in an unadsorbed phase at equilibrium conditions and is expressed in equation 1 below, $$\text{Selectivity} = B_{x/y} = \frac{(x/y)a}{(x/y)u} \quad (1)$$

where $x$ and $y$ feed represent para-xylene and meta-xylene respectively, in volume percent, and the subscripts $a$ and $u$ represent the adsorbed and unadsorbed phases respectively. The equilibrium conditions as defined here were determined when a feed passed containing these two isomers was passed over a bed of adsorbent and did not change composition after contacting the bed of adsorbent, or, in other words, there was no net transfer of material occurring between the unadsorbed and adsorbed phases when the selectivity of the two isomers was measured.

As can be seen, where the selectivity of the two isomers approaches unity, there is no preferential isomer adsorption by the adsorbent. As the value of B becomes greater than unity, there is a preferential selectivity by the adsorbent of one isomer. When comparing the selectivity of para-xylene over meta-xylene, a B larger than unity indicates preferential adsorption of para-xylene within the adsorbent while a B less than unity would indicate that meta-xylene is preferentially adsorbed, leaving an unadsorbed phase richer in para-xylene and an adsorbed phase richer in meta-xylene.

In adsorptive-separation processes, separation can be effected through the use of a crystalline aluminosilicate zeolite adsorbent. Common zeolites which can effectively separate the various aromatic isomers are the synthetically prepared Type X and Type Y zeolites containing selected cations at the exchangeable cationic sites within the zeolite crystal structure.

Both the natural and synthetic aluminosilicates may be used as adsorbents in the present invention. A crystalline zeolitic aluminosilicate encompassed by the present invention for use as an adsorbent includes those wherein the aluminosilicate has cage structures in which the alumina and silica tetrahedra are intimately connected with each other in an open, three-dimensional crystalline network with the tetrahedra cross-linked by the sharing of oxygen atoms. The spaces between the tetrahedra are occupied by water molecules prior to dehydration. Subsequent, partial or total dehydration results in crystals interlaced with channels of molecular dimensions. Thus, the crystalline aluminosilicates are often referred to as molecular sieves. In the hydrated form, the crystalline aluminosilicates may be represented by the formula represented in equation 2, $$M_{2/n}O : Al_2O_3 : wSiO_2 : yH_2O \quad 2.$$

where M is a cation which balances the electrovalence of the tetrahedra, $n$ represents the valence of the cation, $w$ represents the moles of $SiO_2$, and $y$, the moles of water. The cations may be any one of a number of cations such as, for example, certain selected cations from the alkali metal cations or the alkaline earth cations.

Crystalline aluminosilicates which find use as adsorbents in the process of this invention possess relatively well-defined pore structures. The exact type aluminosilicate is generally referred to by the particular silica-alumina ratio and the pore dimensions of the cage structures. The faujasites are commonly represented as Type X and Type Y structured aluminosilicates and are defined by their varying silica to alumina ratios.

The Type X structured zeolite can be represented in terms of the mole ratio of oxides as represented in the following equation 3, $$0.9 \pm 0.2 M_{2/n}O : Al_2O_3 : 2.5 \pm 0.5 SiO_2 : yH_2O \quad 3.$$

where M represents at least 1 cation having the valence of not more than 3, $n$ represents the valence of M, and $y$ is a value up to about 8, depending upon the identity of M and the degree of hydration of the crystal. Zeolite Type X is described in U.S. Pat. No. 2,882,244.

The Type Y structured zeolite may be represented in the terms of the mole ratio of oxides for the sodium form as represented in the following equation 4, $$0.9 \pm 0.2 Na_2O : Al_2O_3 : wSiO_2 : yH_2O \qquad 4.$$

where $w$ is a value of from about 3 to about 9 and $y$ is a value less than about 8.

The exchangeable cationic sites for the Type X and Type Y zeolites, in general, can be defined as represented in equation 2 above "M."

Cationic exchange or base exchange methods are generally known to those familiar with the field of crystalline aluminosilicate production and are generally performed by contacting a zeolite with an aqueous solution of soluble salts of the cations or cation desired to be exchanged on the sieve. The desired degree of cation exchange is allowed to take place before the sieves are removed from the aqueous solution and dried to a desired water content. It is contemplated that in cationic exchange, or base exchange methods, that the cation exchange may take place either by using individual solutions of the desired cations to be placed on the molecular sieve or by using exchange solutions containing mixtures of the cations which are desired to be exchanged onto the crystalline aluminosilicate zeolite.

In this specification, the terms Type X and Type Y structured zeolites shall refer to the basic crystalline aluminosilicates described in equation 3 and 4 above which contains any one or combination of cations, hereinafter indicated.

The cations or metals which can be placed on the Type X or Type Y structured zeolites include potassium, barium, silver, cesium, praseodymium, neodymium, samarium, barium and potassium, beryllium and potassium, magnesium and potassium, rubidium and potassium, cesium and potassium, rubidium and barium, cesium and barium, copper and potassium and combinations thereof or other combinations or single cations hereinafter indicated in Table I.

The adsorption zone which employs the previously described adsorbents selectively adsorbs a particular isomer from the meta-xylene para-xylene stream passed into that zone. Specifically, where a para-xylene meta-xylene isomer mixture is fed into the adsorption zone containing a selected adsorbent, one the isomers is selectively retained by the adsorbent, one the isomers is selectively retained by the adsorbent while the other isomer in the feed mixture occupies the external volume surrounding the adsorbent and is not adsorbed with the degree of tenacity that the selectively retained isomer is adsorbed. Typically, the basic operating conditions can include passage of the feed stock in liquid or vapor phase through a bed of an adsorbent material. For ease of separation and for optimum contact area, the adsorbent is a small particle material and is generally 20 to 40 mesh in size. The mixed para-xylene, and meta-xylene feed stock is contacted with the adsorbent at conditions which allow a portion of the feed stock and typically substantially all of a particular isomer present in the feed stock to be retained by the adsorbent. The less selectively retained isomer of the feed, which in the art is typically referred to as a raffinate material, is removed from the adsorbent bed by contact with a third stream consisting either of another hydrocarbon, a gaseous material or in some instances a material which can desorb the selectively retained components of the feed but which is diluted with another hydrocarbon or other material to such an extent that there is no desorption of the selectively retained material so that a mere washing of the adsorbent of raffinate material occurs. Thus, either para-xylene or meta-xylene may be selectively retained but it is preferred to selectively retain para-xylene and recover meta-xylene from the raffinate. Thereafter, the adsorbent is contacted with a desorbent material at desorption conditions to effect the removal of the selectively retained isomer of the feed stock from an adsorbent. The adsorption and desorption operating conditions can be effected in either liquid or vapor phase at substantially the same or different pressures and/or substantially the same or different temperatures. Adsorption conditions can include temperatures in the range of from about ambient to about 250°C. and pressures generally above atmospheric and in most instances within the range from about atmospheric to about 1,500 psig.

Desorption conditions can be within those recited for the adsorption conditions. In some instances, both vapor and liquid combination operations can be effected, that is, adsorption can be effected in a liquid phase and desorption in the vapor phase, or adsorption in the vapor phase and desorption effected in the liquid phase with various temperature and/or pressure changes associated with the requirements to perform the operations in different phases. When dealing with high molecular weight feed stocks it is generally preferred to use liquid phase operations for both adsorption and desorption operations in order that the temperature requirements in the process be substantially reduced, thereby reducing the possibility of any side reactions from occurring at the higher temperatures, through any catalytic effects which may possibly be present within the adsorbent.

The overall operations effected in the adsorption zone can be performed by typical swing-bed type operations or by employing the simulated moving-bed countercurrent flow operations. It is well known to those skilled in the separation art that manifold systems can be incorporated, where swing-bed operations are to be used, to allow continuous production of extract and raffinate streams by manipulating the input and output streams to the individual adsorption beds to effect continuous adsorption and desorption steps. The simulated moving-bed, countercurrent flow operations are typically performed through the use of a series of inlet and and outlet lines connected to an elongated bed of adsorbent which lines are advanced in the direction of the general fluid flow through the fixed-bed by using a particular type of a rotating valve which allows the various operations to take effect simultaneously at different areas of the fixed-bed. When observing the operations from a certain location within the adsorption bed, adsorption and desorption cycles are seen in a repetitive manner and in a way which allows the efficient production of the desired extract and raffinate streams. The overall countercurrent fixed-bed simulated moving-bed type operations are generally demonstrated in U.S. Pat. No. 2,985,589. Preferably, operations of the adsorption or separation zone of this invention are similar to the operations disclosed in that reference patent.

Desorbents which can be used in the operation of the adsorption zone include aromatics such as benzene, toluene, a diethylbenzene or other aromatics which are relatively easily separated from the para-xylene and meta-xylene feed to the adsorption zone and which easily displace the extract material from the adsorbent. Preferred desorbents are toluene or a diethylbenzene. Additionally, gases may be used as a desorption medium where in cases where the desorption step is carried out at a temperature higher than the temperature at which the para-xylene or meta-xylene is adsorbed or a pressure lower than the pressure at which adsorption occurs.

An alternative process utilizing the inventive concepts of the process of the present invention comprises first fractionating an aforedescribed $C_8$ aromatic stream, by methods also previously described to produce a relatively ortho-xylene free, ethylbenzene, meta-xylene and para-xylene fraction overhead and a relatively ethylbenzene free, meta-xylene, para-xylene and ortho-xylene bottoms fraction. The overhead fraction is isomerized and the resultant mixture recovered as previously indicated. The bottoms fraction is then separated in the earlier described selective adsorption step wherein either the para-xylene or meta-xylene is selectively retained and the non-selectively retained component is recovered in admixture with ortho-xylene. This mode of operation is readily obtainable since either meta-xylene or para-xylene is readily separated from ortho-xylene by the previously indicated fractionation techniques so as to produce a relatively pure ortho-xylene product stream and a relatively pure product stream comprising the less selectively retained of the para- and meta- isomers. Produced as a result are each of the individual xylene isomers relatively free of any of the other $C_8$ isomers—i.e. at least 95 percent purity on a $C_8$ aromatic basis.

DESCRIPTION OF THE DRAWING AND ILLUSTRATIVE EMBODIMENT

The process of the present invention can be most clearly described by reference to the attached drawing, schematically illustrating the recovery of each of the xylene isomers from a mixed $C_8$ aromatic feed stock. Of necessity, certain limitations must be present in a diagram of the type presented and no intention is made thereby to limit the scope of this invention to reactants, concentrations, weights, operating conditions, catalysts, etc. Miscellaneous appurtenances including valves, pumps, compressors, separators, reboilers, etc. have been eliminated. Only those vessels and lines necessary for a complete and clear understanding of the process of the present invention are illustrated with any obvious modifications made by those possessing expertise in the art of $C_8$ aromatic isomerization and recovery being included within the generally broad scope of the present invention.

Referring now to the schematic diagram, $C_8$ aromatic feed stock enters the process of the present invention via line 1 and is admixed with a hereinafter described isomerization zone 4 effluent entering via line 20 and is passed via line 1 to provide a fractionation zone 2 feed comprising on a $C_8$ aromatic basis, 35.6 units (moles per hour) of ethylbenzene, 40.8 units of para-xylene, 102.8 units of meta-xylene and 33.7 units of ortho-xylene. Fractionation zone 2 is a conventional fractional distillation column employing about 200 trays and a 15:1 reflux ratio. Removed as bottoms from fractionation zone 2 via line 6 is a relatively ethylbenzene free stream comprising 0.3 units of ethylbenzene, 23.7 units of para-xylene, 92.8 units of meta-xylene and 33.7 units of ortho-xylene. Removed as overhead from fractionation column 2 via line 3 is an ortho-xylene free stream containing 35.3 units of ethylbenzene, 17.1 units of para-xylene and about 10 units of meta-xylene. This overhead fraction is passed via line 3 to isomerization zone 4 which is maintained under isomerization conditions to effect the production of additional amounts of ortho-xylene. In addition, a $C_8$ aromatic stock deficient in a desired xylene isomer may first enter the general process of the present invention via line 5 and pass to isomerization zone line 3 instead of entering the process via line 1 as previously described.

More specifically, isomerization zone 4 contains an isomerization catalyst containing about 0.4 percent platinum and about 2 percent fluorine combined with a spherical, gamma-alumina support. Suitable isomerization conditions to effect the isomerization of the ethylbenzene contained in the feed to isomerization zone 4 include a liquid hourly space velocity of about 2 hr.$^{-1}$ a reactor pressure of about 175 psig., a reactor temperature of about 750°F., a hydrogen to hydrocarbon mole ratio to the reactor zone of about 6:1 and a chlorine addition to the reactor feed of about 50 parts per million (weight). The resultant product from isomerization zone 4 is then removed via line 20 and admixed with the $C_8$ aromatic feed stock entering line 1 and passed to fractionation zone 2 as previously described. Any $C_7$— hydrocarbons formed as a result of side reactions in isomerization zone 4 may be removed, by means not shown, from line 3 to prevent any accumulation of these species in the isomerization loop in the process of this invention.

Fractionation zone 2 bottoms, removed via line 6, are further fractionated in fractionation zone 7 to produce an ortho-xylene bottoms fraction removed via line 8 and which contains essentially 0 units of ethylbenzene and para-xylene, 1.2 units of meta-xylene and about 32 units of ortho-xylene. Any $C_9$+ aromatics present, either because of formation in isomerization zone 4 or passed via line 1, are readily removed from line 8 by conventional fractionation techniques. Fractionation zone 7 is a conventional fractionation column employing about 100 plates and about a 10:1 reflux ratio. The relatively ortho-xylene free overhead fraction is removed from fractionation zone 7 via line 9 and contains about 0.3 units of ethylbenzene, 23.7 units of para-xylene, 91.6 units of meta-xylene and about 1.7 units of ortho-xylene. This relatively ortho-xylene free fraction is then passed to separation zone 10 wherein the para-xylene is allowed to be adsorbed by a selective crystalline aluminosilicate zeolite and the non-selectively retained meta-xylene is withdrawn from the adsorbent contained in separation zone 10 as a raffinate stream via line 12. This raffinate stream is then further purified in fractionation zone 13 to remove therefrom any entrained desorbent (toluene), etc. overhead via line 14 and a relatively pure meta-xylene product as bottoms via line 15 and containing about 91.5 units of meta-xylene, 1.7 units of ortho-xylene and about 0.2 units of ethylbenzene. The adsorbent contained in separation zone 10 is then contacted with a desorbent material, toluene, entering via line 11 which displaces the selectively adsorbed para-xylene from the adsorbent. The para-xylene is then removed via line 16 and passed to fractionation zone 17 wherein the toluene is removed overhead via line 18 and the para-xylene product containing about 23.6 units of para-xylene, about 0.1 units of meta-xylene and about 0.1 units of ethylbenzene is removed via line 19. More particularly, separation zone 10 contains an adsorbent which is a Type X structured zeolite and which contains about 1.3 weight percent sodium, 3.5 wt. percent potassium, and 18.6 wt.% barium. The adsorbent is about a 20–40 mesh particle size and weighs about 48 pounds per cubic foot. The adsorption and desorption operations are effected at 350°F. and 140 psig. to result in a liquid phase operation.

EXAMPLE

The following example is presented to more particularly and specifically show the various adsorbents which may be utilized in the selective adsorption step of the process of the present invention. This example, however, is not to be construed as limiting on the generally broad scope of the claimed invention.

In testing various adsorbents, the selectivity as previously defined in equation 1, was determined using apparatus and procedures generally described as follows. The apparatus used consisted of a chamber of approximately 40 cc. volume having inlet and outlet ports at opposite ends of the chamber. The chamber was contained within a constant temperature control system and, in addition, pressure control equipment was used to operate the chamber at a constant predetermined pressure. Attached to the outlet line connected to the outlet of the chamber was a gas chromatograph which was used to periodically analyze a portion of the effluent stream leaving the adsorbent chamber during adsorption and desorption operations. A feed mixture having a known composition was passed through the adsorbent chamber at a regulated pressure and temperature until the effluent composition flowing from the adsorbent chamber remained at a constant composition indicating that there was no net transfer between the adsorbed phase within the adsorbent and the unadsorbed or external phase surrounding the adsorbent particles. A second mixture containing a hydrocarbon which was able to desorb the previously adsorbed components of the feed from the adsorbent was then passed through the adsorbent chamber. The gas chromatograph was used to monitor the unadsorbed or external phase and the material desorbed from within the adsorbent. Knowing the composition of these two streams and their respective flow rates, a selectivity for various components in the feed stream could be determined.

The feed stream which was used to measure the selectivities of various adsorbents used in the various adsorption zones consisted of equal quantities (8 ⅓ vol. percent each) of ethylbenzene, para-xylene and meta-xylene mixed with 2,2,4-trimethylpentane to render a feed mixture containing 75 vol. percent paraffinic material and 25 vol. percent $C_8$ aromatic isomer material. The $C_8$ aromatic isomers were diluted with the paraffin material to facilitate ease of analyzing the adsorbed and unadsorbed phases for the selectivity determination. Ortho-xylene was excluded, since its presence would have complicated the analytical procedures although previous experience indicated that the ortho-xylene isomer behaves roughly the same as the meta-xylene isomer. The desorbent material consisted of 25 vol. percent toluene and 74 vol. percent 2,2,4-trimethylpentane. One vol. percent neohexane was also present as a tracer to determine desorbent breakthrough in the effluent stream leaving the adsorbent chamber. The adsorption and desorption cycles were performed in the vapor phase at about 260°C. and slightly above atmospheric pressure.

Various adsorbents were tested, using the testing procedure as described, to determine the capacity and selectivity of the various adsorbents for various $C_8$ aromatic isomers. The two basic starting materials used in the production of the various adsorbents tested in this example were the Type X or Type Y structured zeolites. The adsorbents, as indicated in the following Table I, contained various single cations or combination of two cations present within the zeolite and were essentially totally ion-exchanged, that is, most of the cationic sites within the Type X or Type Y structured zeolite contained the indicated cation.

The cation exchange was performed using a chromatographic-type exchange column. The total number of cation equivalents used to exchange the original sodium form of the Type X or Type Y zeolite was three times the total equivalents of sodium present in the zeolite. The volume of solution containing the cations to be exchanged was six times the volume of the Type X or Type Y starting material with the cation solution flow rate passing through the zeolite at approximately 80 to 100 ml. per hour. Whenever two cations were used to simultaneously exchange the sodium in the original Type X or Type Y zeolite, the total number of equivalents of each cation used was halved; all other conditions remained equal. After the cation exchange procedure had been completed, the adsorbent was water-washed, air-equilibrated and finally treated with air in a muffle furnace at about 550°C. After heating, the sieves were cooled in an inert anhydrous atmosphere and then used in the described adsorbent chamber. Table I below shows the capacity of the sieve for various $C_8$ aromatic isomers as represented by the milliliters of the particular $C_8$ aromatic isomer adsorbed per 40 ml. of sieve in the adsorbent chamber. The selectivities were determined using equation 1 and are represented for determining the selectivities of the combination of para-xylene and meta-xylene.

TABLE I (SELECTIVITIES AND CAPACITIES OF VARIOUS ADSORBENTS)

| Zeolite Type | Cation (S) on Sieve | Capacity Ml/40ml P | Sieve M | Selectivity, B P/M | Adsorbent description |
|---|---|---|---|---|---|
| Y | Li | 1.74 | 2.43 | 0.72 | A |
| Y | Na | 1.69 | 2.23 | 0.75 | B |
| Y | K | 2.05 | 1.12 | 1.83 | C |
| Y | Rb | 1.84 | 1.22 | 1.51 | D |
| Y | Cs | 1.38 | 0.92 | 1.50 | E |
| Y | Ba | 0.84 | 0.93 | 0.71 | F |
| Y | Mg | 1.55 | 2.65 | 0.59 | G |
| Y | Ca | 1.01 | 2.86 | 0.35 | H |
| Y | Sr | 1.12 | 2.56 | 0.44 | I |
| Y | Ba | 1.51 | 1.19 | 1.27 | J |
| Y | K, Ba | 2.70 | 0.72 | 3.76 | K |

| | | | | | |
|---|---|---|---|---|---|
| Y | K, Be | 2.24 | 1.06 | 2.11 | L |
| Y | K, Mg | 2.16 | 0.96 | 2.25 | M |
| Y | K, Rb | 1.70 | 0.94 | 1.80 | N |
| Y | K, Cs | 1.72 | 0.97 | 1.79 | O |
| Y | Rb, Ba | 2.03 | 0.99 | 2.05 | P |
| Y | Cs, Ba | 1.86 | 1.18 | 1.57 | Q |
| X | Na | 1.50 | 1.48 | 1.02 | R |
| X | Ba, K | 2.47 | 0.99 | 2.49 | S |
| X | Ag | 1.63 | 1.53 | 1.07 | T |
| Y | Mn | 1.14 | 1.74 | 0.60 | U |
| Y | Cd | 1.13 | 1.84 | 0.61 | V |
| Y | Cu, Cd | 1.18 | 2.18 | 0.54 | W |
| Y | Cu, Ag | 1.67 | 2.65 | 0.63 | X |
| Y | Zn, Ag | 2.33 | 2.63 | 0.89 | Y |
| Y | Cu | 1.33 | 2.14 | 0.62 | Z |
| Y | Cu, K | 1.90 | 1.15 | 1.65 | AA |

In referring to the adsorbents listed in Table I above, there are listed some adsorbents which provide a greater selectivity for meta-xylene than para-xylene. These adsorbents, for example adsorbents A, B, F, G, H, I, U, V, W, X, Y and Z, would provide a system in which meta-xylene would be preferentially adsorbed with para-xylene being excluded. In this instance the extract material would be meta-xylene while the raffinate material would contain para-xylene. Adsorbents C, D, E, J, K, L, M, N, O, P, Q, R, S, T and AA, however, will provide a system in which para-xylene would be preferentially adsorbed. In this instance, the extract material would be para-xylene while the raffinate material would be meta-xylene. It is these para-xylene selective sieves that are preferred for utilization in the process of the present invention since in typically encountered commercial stream, meta-xylene is about twice as prevalent as para-xylene, hence larger adsorbent beds would be required to retain meta-xylene versus para-xylene.

I claim as my invention:

1. A process for the simultaneous recovery and production of meta-xylene, para-xylene and ortho-xylene from a $C_8$ aromatic stream which comprises the steps of:
   a. separating, by fractional distillation, a $C_8$ aromatic stream comprising ortho-xylene, meta-xylene, para-xylene and ethylbenzene, To produce a relatively ortho-xylene free, ethylbenzene, meta-xylene and para-xylene fraction, a relatively ortho-xylene and ethylbenzene free, mixed meta-xylene and para-xylene fraction and a relatively pure ortho-xylene fraction;
   b. contacting, in an isomerization zone, said ethylbenzene, meta-xylene and para-xylene fraction with an isomerization catalyst maintained at isomerization conditions to produce a $C_8$ aromatic mixture of ortho-xylene, meta-xylene, para-xylene and ethylbenzene;
   c. separating said $C_8$ aromatic mixture produced in step (b) in fractionation step (a); and,
   d. separating, by selective zeolitic crystalline aluminosilicate adsorption said mixed meta-xylene and para-xylene fraction of step (a) to produce a relatively pure para-xylene stream and a relatively pure meta-xylene stream.

2. The process of claim 1 wherein said fractional distillation of step (a) comprises first fractionating said $C_8$ aromatic stream to produce a relatively ethylbenzene free, ortho-xylene, meta-xylene and para-xylene bottoms fraction and a relatively ortho-xylene free, ethylbenzene, meta-xylene and para-xylene overhead fractions, said bottoms fraction being then fractionated to produce said meta-xylene and para-xylene fraction and said relatively pure ortho-xylene fraction.

3. The process of claim 1 wherein said selective adsorption of step (d) comprises the steps of:
   i. contacting the mixed meta-xylene and para-xylene fraction with a mass of crystalline aluminosilicate contained in an adsorption zone maintained at adsorption conditions to effect the selective retention of an extract material containing meta-xylene or para-xylene;
   ii. withdrawing from said adsorption zone, a raffinate stream containing a less selectively retained xylene isomer;
   iii. contacting said adsorbent mass at desorption conditions with a desorbent material to effect a removal of the extract material from the adsorbent; and,
   iv. withdrawing from the adsorbent mass an extract stream comprising said extract material and desorbent.

4. The process of claim 3 wherein said extract stream comprises para-xylene.

5. The process of claim 3 wherein said adsorption and desorption are effected in the liquid phase.

6. The process of claim 3 wherein said desorbent is toluene or a diethylbenzene.

7. The process of claim 3 wherein said aluminosilicate is a Type X or Type Y structured zeolite.

8. The process of claim 7 wherein said zeolites contain cationic sites occupied by a member selected from the group consisting of potassium, barium, silver, cesium, praseodymium, neodymium, samarium, barium and potassium, beryllium and potassium, magnesium and potassium, rubidium and potassium, cesium and potassium, rubidium and barium, cesium and barium, copper and potassium and combinations thereof.

9. A process for the simultaneous recovery and production of meta-xylene, para-xylene and ortho-xylene from a $C_8$ aromatic stream which comprises the steps of:
   a. separating, by fractional distillation, a $C_8$ aromatic stream comprising ortho-xylene, meta-xylene, para-xylene and ethylbenzene to produce a relatively ortho-xylene free, ethylbenzene, meta-xylene and para-xylene overhead fraction and a relatively ethylbenzene free, meta-xylene, para-xylene and ortho-xylene bottoms fraction;
   b. contacting said overhead fraction in an isomerization zone with an isomerization catalyst maintained at isomerization conditions to produce a $C_8$ aromatic mixture of ortho-xylene, meta-xylene, para-xylene and ethylbenzene.
   c. separating said $C_8$ aromatic mixture produced in step (b) in step (a).
   d. contacting the bottoms fraction of step (a) with a crystalline aluminosilicate mass selective for para-xylene or meta-xylene at adsorption conditions to effect the retention of an extract material containing meta-xylene or para-xylene and to produce a raffinate stream containing the less selectively retained meta-xylene or para-xylene in admixture with ortho-xylene.
   e. withdrawing, from said adsorbent, at desorption conditions, said extract material relatively free of other $C_8$ aromatic isomers; and f. separating by fractional distillation said raffinate stream to produce a relatively pure ortho-xylene stream and a relatively pure stream comprising the less selectively retained meta-xylene or para-xylene.

10. The process of claim 9 wherein para-xylene is selectively retained in the extract and the raffinate contains the less selectively retained meta-xylene.

11. The process of claim 9 wherein said aluminosilicate is a Type X or Type Y structured zeolite.

12. The process of claim 11 wherein said zeolite contain cationic sites occupied by a member selected from the group consisting of potassium, barium, silver, cesium, praseodymium, neodymium, samarium, barium and potassium, beryllium and potassium, magnesium and potassium, rubidium and potassium, cesium and potassium, rubidium and barium, cesium and barium, copper and potassium and combinations thereof.

* * * * *